(12) United States Patent
Kraft (10) Patent No.: US 6,411,822 B1
(45) Date of Patent: Jun. 25, 2002

(54) COMMUNICATION TERMINAL

(75) Inventor: Christian Kraft, København N (DK)

(73) Assignee: Nokia Mobile Phone Limited, Espoo (FI)

( * ) Notice: Subject to any disclaimer, the term of this patent is extended or adjusted under 35 U.S.C. 154(b) by 0 days.

(21) Appl. No.: 09/383,125

(22) Filed: Aug. 25, 1999

(30) Foreign Application Priority Data

Aug. 26, 1998 (GB) ............................................ 9818617

(51) Int. Cl.⁷ ................................................ H04Q 7/20
(52) U.S. Cl. ........................ 455/558; 455/556; 455/557
(58) Field of Search ................................ 455/403, 425, 455/550, 551, 556, 557, 558, 566, 575, 66, 418, 415, 460; 379/354, 355

(56) References Cited

U.S. PATENT DOCUMENTS

| | | | |
|---|---|---|---|
| 5,267,308 A | 11/1993 | Jokinen et al. | 379/354 |
| 5,493,105 A * | 2/1996 | Desai | 235/375 |
| 5,568,546 A * | 10/1996 | Marutiak | 379/355.01 |
| 5,585,789 A | 12/1996 | Haneda | 340/825.52 |
| 5,675,627 A * | 10/1997 | Yaker | 455/558 |
| 5,684,873 A | 11/1997 | Tiilikainen | 379/354 |
| 5,710,810 A | 1/1998 | Tiilikainen | 370/355 |
| 5,887,264 A | 3/1999 | Kohler | 455/461 |
| 5,926,769 A | 7/1999 | Valimaa et al. | 455/564 |
| 6,128,509 A * | 10/2000 | Yeijola et al. | 455/556 |
| 6,175,741 B1 * | 1/2001 | Alperovich | 455/458 |
| 6,223,059 B1 * | 4/2001 | Haestrup | 455/566 |

FOREIGN PATENT DOCUMENTS

| | | |
|---|---|---|
| EP | 0 378 775 A2 | 7/1990 |
| EP | 0 663 752 A1 | 7/1995 |
| GB | 2 307 137 A | 5/1997 |
| GB | 2 313 736 A | 12/1997 |
| GB | 2 317 246 A | 3/1998 |
| WO | WO 98/09417 | 3/1998 |

OTHER PUBLICATIONS

GSM "Specification of the Subscriber Identity Module—Mobile Equipment (SIM– ME) interface", GSM 11.11, version 5.5.0, European Telecommunications Standards Institute.

United Kingdom Search Report.

* cited by examiner

Primary Examiner—Nay Maung
Assistant Examiner—Jean A Gelin
(74) Attorney, Agent, or Firm—Perman & Green, LLP (57) ABSTRACT

A communication terminal comprises display device for displaying information and connector for establishing a releasable connection to an exchangeable smart card. The smart card includes a phonebook memory having a group of records each of which is associated with a record identification number, a name label field in which a name label may be stored and a dialing umber field in which a dialing number may be stored. The processor device processes the phonebook information to be displayed in the display upon request from the user. The processor device identifies records in said group of records having name labels corresponding to the name label requested, associates the dialing numbers of the identified records with type labels in dependence of the corresponding record identification number and sets up a display image for the display in which the types of the dialing numbers are indicated by the associated type label.

13 Claims, 9 Drawing Sheets

| memory position | name | number |
|---|---|---|
| 001 | Lars | +4599933322 |
| 002 | Kurt | +4512345678 |
| 003 | Kurt | Empty |
| 004 | Kurt | +4511223344 |
| 005 | Lars | +4512121212 |
| 006 | Christian | +4511111111 |
| 007 | Kurt | +4544332211 |
| 008 | Lars | +4511223344 |
| 009 | Empty | Empty |
| 010 | Christian | +4522222222 |
| • • • • | | |
| 021 | Christian | +4533333333 |
| 022 | Paul Thomas | +4413123123 |
| • • • • | | |
| 029 | Christian | +4587654321 |
| • • • • | | |
| 250 | Empty | Empty |

| memory position | name | number |
| --- | --- | --- |
| 001 | Lars | +4599933322 |
| 002 | Kurt | +4512345678 |
| 003 | Kurt | Empty |
| 004 | Kurt | +4511223344 |
| 005 | Lars | +4512121212 |
| 006 | Christian | +4511111111 |
| 007 | Kurt | +4544332211 |
| 008 | Lars | +4511223344 |
| 009 | Empty | Empty |
| 010 | Christian | +4522222222 |
| • • • • | | |
| 021 | Christian | +4533333333 |
| 022 | Paul Thomas | +4413123123 |
| • • • • | | |
| 029 | Christian | +4587654321 |
| • • • • | | |
| 250 | Empty | Empty |

COMMUNICATION TERMINAL

BACKGROUND OF THE INVENTION

The invention relates to a new method for handling a phonebook stored on an exchangeable card memory in portable communication terminal.

A SIM Card according to the GSM specification "Specification of the Subscriber Identity Module—Mobile Equipment (SIM—ME) interface", GSM 11.11 version 5.5.0, published by European Telecommunications Standards Institute, cannot store multiple phone numbers per name. Multiple phone numbers per name is a very useful feature that allows the user for the same name to store for instance private number, company number, mobile number, fax number etc for each name in his memory. The reason that the SIM Card does not support this is that the SIM memory is a simple "linear" storage unit with a row of "drawers" in which a name/label and only one corresponding number can be stored. Both the name/label and the phone number are bound by a pre-set format defined by the operator. Very often only 15 letters are allowed in the name/label area. This causes a problem if the name/label area has to identify both the owner of the phone number and the type of phone number, e.g. "Christian home", "Christian work" or "Christian mobile". The problem increases when two or more persons have the same given name and each have multiple phone numbers. Then it is hard to distinguish between the names and hard to recognize truncations have to be used.

The Nokia 9000 Communicator™ is provided with a contact card directory stored in an internal memory of the phone/communicator. The contact cards each includes identification fields such as fields for "name", "company", "job title", "address" of the person, and a plurality of associated phone number fields such as "phone", "mobile", "fax", "mobile fax" and "E-mail". When a SIM card based phonebook is copied to the dictionary, the names and numbers will as default be copied to the "name" and "phone" fields of the contact cards.

The contact card directory of the Nokia 9000 Communicator™ is much more complex than the SIM card based phonebook so basically all information from the contact card directory has to be transferred manually to the SIM card based phonebook.

SUMMARY OF THE INVENTION

In accordance with the invention there is provided a method of handling phonebook records stored on an exchangeable smart card in order to display dialing numbers associated with a requested name label, said smart card includes a phonebook memory having a group of records each of which is associated with a record identification number, a name label field in which a name label may be stored and a dialing number field in which a dialing number may be stored, said method includes steps of:

sorting in the phonebook memory in order to identify records in said group of records having name labels corresponding to he name label requested;

associating the dialing numbers of the identified records with type labels in dependence of the corresponding record identification number; and displaying both the dialing numbers and the associated type labels.

and communication terminal for handling phonebook records stored on an exchangeable smart card in order to display dialing numbers associated with a requested name label, said smart card includes a phonebook memory having a group of records each of which is associated with a record identification number, a name label field in which a name label may be stored and a dialing number field in which a dialing number may be stored, said terminal comprises:

display means for displaying information;

means for establishing a releasable connection to an exchangeable smart card; and processor means for processing the phonebook information to be displayed in the display upon request from the user, said processor means:

sorts the phonebook memory in order to identify records in said group of records having name labels corresponding to he name label requested;

associates the dialing numbers of the identified records with type labels in dependence of the corresponding record identification number, and sets up a display image for the display in which the types of the dialing numbers are indicated by the associated type label.

Embodiments of the invention provide a method of handling phonebook records stored on an exchangeable smart card in order to display a set of dialing numbers associated with a requested name label.

A phone user changes his phone from time to time and he does not want to use a lot of time in order to re-establish his phonebook. Therefore the possibility to store and transfer the multiple phone numbers via the SIM Card is very attractive. Embodiments of this invention allow this option.

The smart card includes a phonebook memory having a group of records each of which is associated with a record identification number, a name label field in which a name label may be stored and a dialing number field in which a dialing number may be stored.

This is obtained by a method including steps of sorting in the phonebook memory in order to identify records in said group of records having name labels corresponding to the name label requested; associating the dialing numbers of the identified records with type labels in dependence of the corresponding record identification number; and displaying both the dialing numbers and the associated type labels.

Hereby it also has become possible to store several phone numbers under the same name label on the smart card or the SIM (GSM) of the phone. When these name labels are identified the relative position of the record determines whether the associated dialling number is a work phone number, a mobile phone number, a private phone number, a fax number, etc. Based on this information the phone sets up a phonebook display image for displaying the dialling numbers associated with a certain name label and the type of these dialling numbers.

An advantage of the invention is that transferring the smart card to this phone may transfer the phonebook to another telephone. If both phones support the invention the displayed information will be similar to each other. However the phonebook will remain readable even when the smart card is transferred to phones not supporting the multiple phone number concept.

The invention furthermore relates to a communication terminal for handling phonebook records stored on an exchangeable smart card in order to display dialing numbers associated with a requested name label, said smart card includes a phonebook memory having a group of records each of which is associated with a record identification number, a name label field in which a name label may be stored and a dialing number field in which a dialing number may be stored. Said terminal comprises display means for displaying information; means for establishing a releasable connection to an exchangeable smart card; and processor means for processing the phonebook information to be displayed in the display upon request from the user. The processor means sorts the phonebook memory in order to identify records in said group of records having name labels corresponding to he name label requested; associates the dialing numbers of the identified records with type labels in dependence of the corresponding record identification number, and sets up a display image for the display in which the types of the dialing numbers are indicated by the associated type label.

The basic idea is simply to store the phone numbers for each name on the SIM card using the same name for all numbers for that name, and in an order that is relative correct for the names available for each name. In this way the position number (short code) on the SIM card is used to define what type of number it is (GSM, Fax, Private and work number).

Numbers for a particular name will all be stored on the SIM using the original name. This assures that the SIM phone book can be read and will even look meaningful in phones not supporting the concept according to the invention.

DETAILED DESCRIPTION OF THE INVENTION

Figure 1:
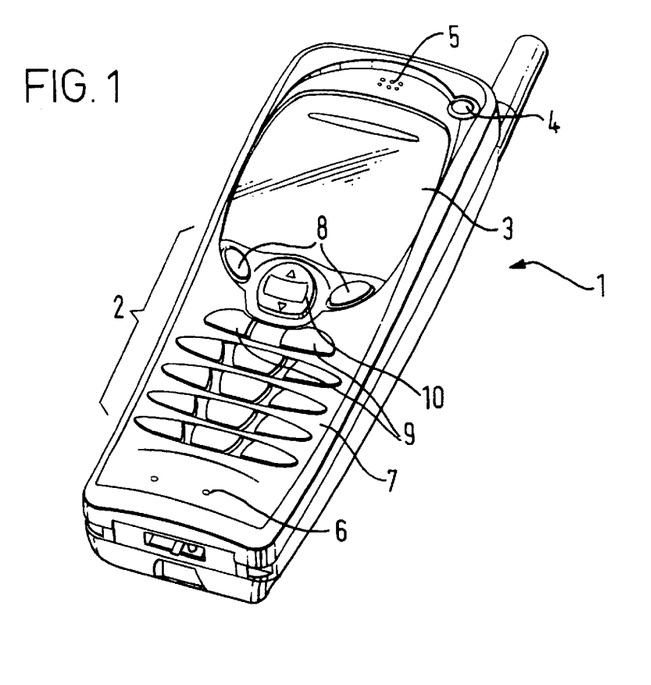
FIG. 1 schematically illustrates a preferred embodiment of a hand portable phone according to the invention.

FIG. 1 shows an embodiment of a phone in accordance with the invention, and it will be seen that the phone, which is generally designated by 1, comprises a user interface having a keypad 2, a display 3, an on/off button 4, a speaker 5, and a microphone 6. The phone 1 according to the preferred embodiment is adapted for communication via a cellular network, e.g. a GSM network, but could have been designed for a cordless network as well. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0–9" or a sign "#" or "*", respectively. In alpha mode each key is associated with a number of letters and special signs used in the text editing.

The keypad 2 additionally comprises two soft keys 8, two call handling keys 9, and a navigation key 10.

The two soft keys 8 have functionality corresponding to what is known from the phone sold under the trademark Nokia 6110™. The functionality of the soft key depends on the state of the phone and the navigation in the menu by using a navigation key. The present functionality of the soft keys 8 is shown in separate fields in the display 3 just above the keys 8.

The two call handling keys 9 are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key with his thumb. This is the best site to place an input key requiring precise motor movements. Many experienced phone users are used to one-hand handling. They place the phone in the hand between the fingertips and the palm of the hand. Hereby the thumb is free for inputting information.

Figure 2:
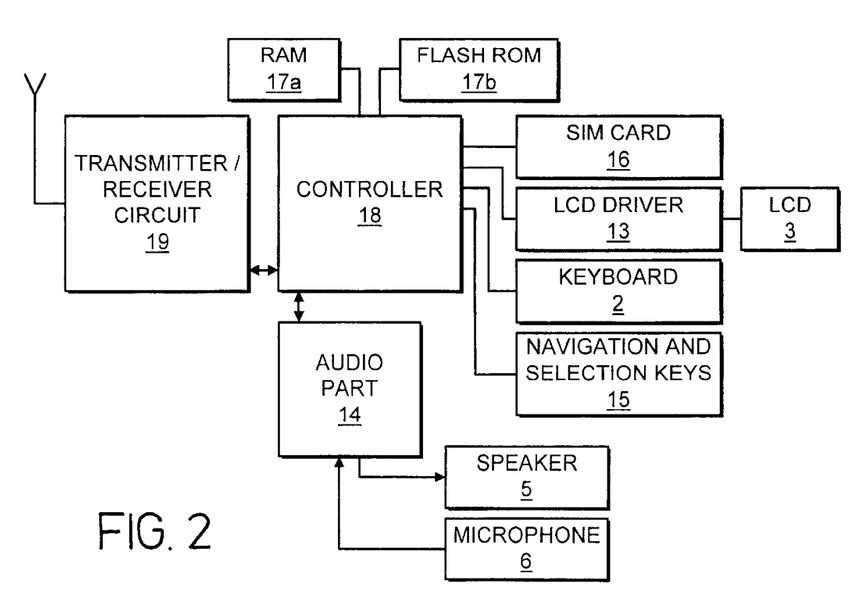
FIG. 2 schematically shows parts of a telephone for communication with a cellular or cordless network.

FIG. 2 schematically shows the most important parts of a preferred embodiment of the phone, said parts being essential to the understanding of the invention. In this embodiment the phone is adapted for use in connection with the GSM network, but, of course, the invention may also be applied in connection with other phone networks, such as cellular networks and various forms of cordless phone systems or in dual band phones accessing sets of these systems/networks. The microphone 6 records the user's speech, and the analog signals formed thereby are A/D converted in an A/D converter (not shown) before the speech is encoded in an audio part 14. The-encoded speech signal is transferred to the processor 18, which i.a. supports the GSM terminal software. The processor 18 also forms the interface to the peripheral units of the apparatus, including a RAM memory 17a and a Flash ROM memory 17b, a smart card or a SIM card 16, the display 3 and the keypad 2 (as well as data, power supply, etc.). The processor 18 communicates with the transmitter/receiver circuit 19. The audio part 14 speech-decodes the signal, which is transferred from the processor 18 to the earpiece 5 via a D/A converter (not shown).

The processor 18 is connected to the user interface. Thus, it is the processor 18 that monitors the activity in the phone and controls the display 3 in response thereto.

The smart card or the SIM Card 16 according to this embodiment of the invention will for the application in a GSM network be defined in the GSM specification "Specification of the Subscriber Identity Module—Mobile Equipment (SIM—ME) interface", GSM 11.11 version 5.5.0, published by European Telecommunications Standards Institute. Such a SIM Card 16 does not support multiple numbers per name stored in a phonebook memory in the SIM card because this memory is a simple "linear" storage unit with a row of "drawers" in which a name/label and only one corresponding number can be stored. Both the name/label and the phone number are bound by a pre-set format defined by the operator. Very often only 15 letters are allowed in the name/label area.

Figure 6:
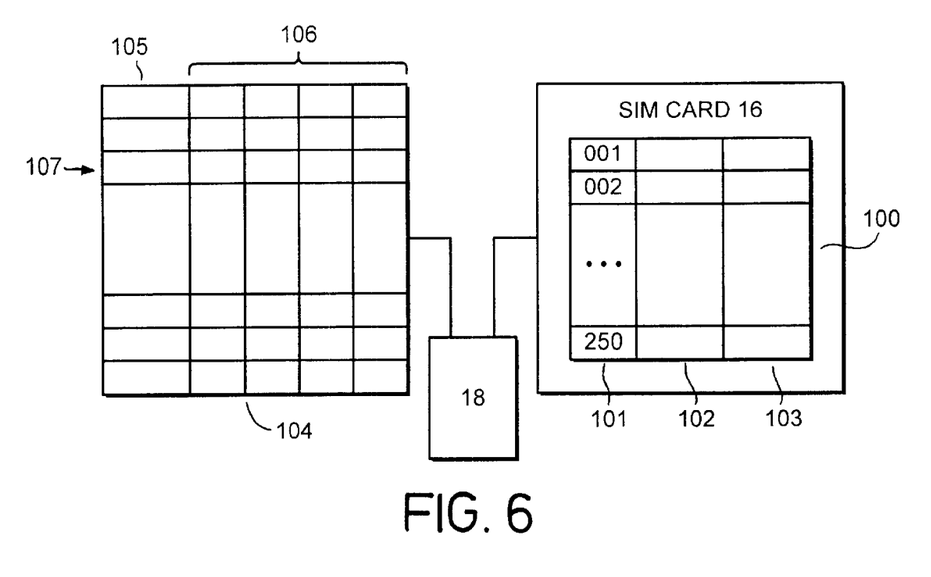
FIG. 6 illustrates the handling of the transfer of the SIM memory to the internal phonebook memory.

The basic structure of phonebook is illustrated with reference to FIG. 3 and FIG. 6. The first column represents the memory location numbers and these numbers are stored in memory location number fields 101. These memory location numbers or record identification number acts as address for the data stored in the record. The second and third column represents a name and the corresponding phone number entered by the user and these data are stored in name label fields 103 and dialing number fields 104, respectively.

According to this embodiment of the invention the phone will display the phone number type relative to the probability of their occurrence.

According to this embodiment the phonebook display will include four dialing number types "private phone number", "work phone number", "fax number" and "mobile number". The private PSTN based phone number is according to this embodiment given the highest priority. The work phone number is given the second highest priority, the fax number the third highest priority and the mobile number the lowest priority. However this prioritizing may be subject for a user defined re-prioritizing.

Therefore the dialing number stored in the record having the lowest memory location number for a name label will automatically be deemed to be the private number of the person identified by the name label, and the dialing number stored in the record having the second lowest memory location number for same name label will be deemed to be the work number, etc. The number of dialing numbers in the multi number per name view and the prioritizing order of these may be varied within the scope of the invention.

Figure 3:
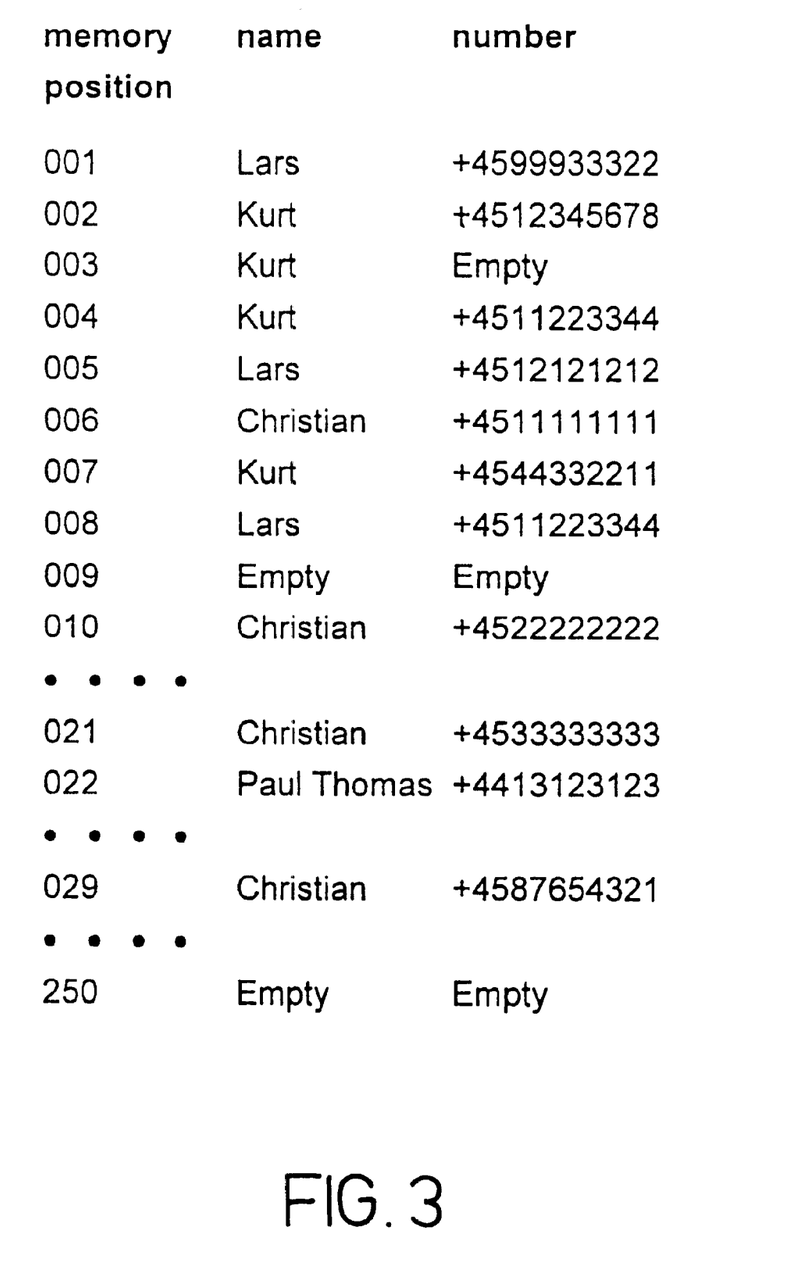
FIG. 3 illustrates the basic structure of a phonebook memory stored in the SIM card.

The first record in FIG. 3 has the memory location number "001" and the name label "Lars". The phone number "+4599933322" stored in the dialing number field will be interpreted as the private phone number for Lars.

The second record has the memory location number "002" and the name label "Kurt". The phone number "+4512345678" stored in the dialing number field will be interpreted as the private phone number for Kurt. The third record has the memory location number "003" and the name label "Kurt". The dialing number field is empty which means that no work number has been stored for Kurt. This dummy record has been added automatically when the fax number has been entered for Kurt in the fourth record. Otherwise the fax number would have been displayed as the work number. The seventh record has the memory location number "007" and the name label "Kurt". The phone number "+4544332211" stored in the dialing number field will be interpreted as the mobile phone number for Kurt.

Basically the phone starts to fill in the records having the lowest memory location numbers. When the user of the phone wants to enter a low priority dialing number and dialing numbers having higher priority has not been entered yet the processor of the phone has to reserve records for these un-used higher priority numbers by establishing dummy records as the record having the memory location number "003".

If the user has not defined the low priority numbers for a certain name (e.g. the fax and the GSM number), there is no need use dummy records for reserving these types.

When a phone number or a name has been deleted this will a totally empty record as the record having the memory location number "009". The memory as illustrated in FIG. 3 has 250 records. In general this number is defined by the operators and may vary from approximately 100 and upwards. However the trend is that this number will increase in the coming years.

According to another embodiment the processor allocates a group of four record the first time a name label is entered. This would mean that the dialing number of "Lars" would have been stored in the records having the memory location number "001"–"004", "Kurt" in the records having the memory location number "005"–"008", etc.

Figure 7:
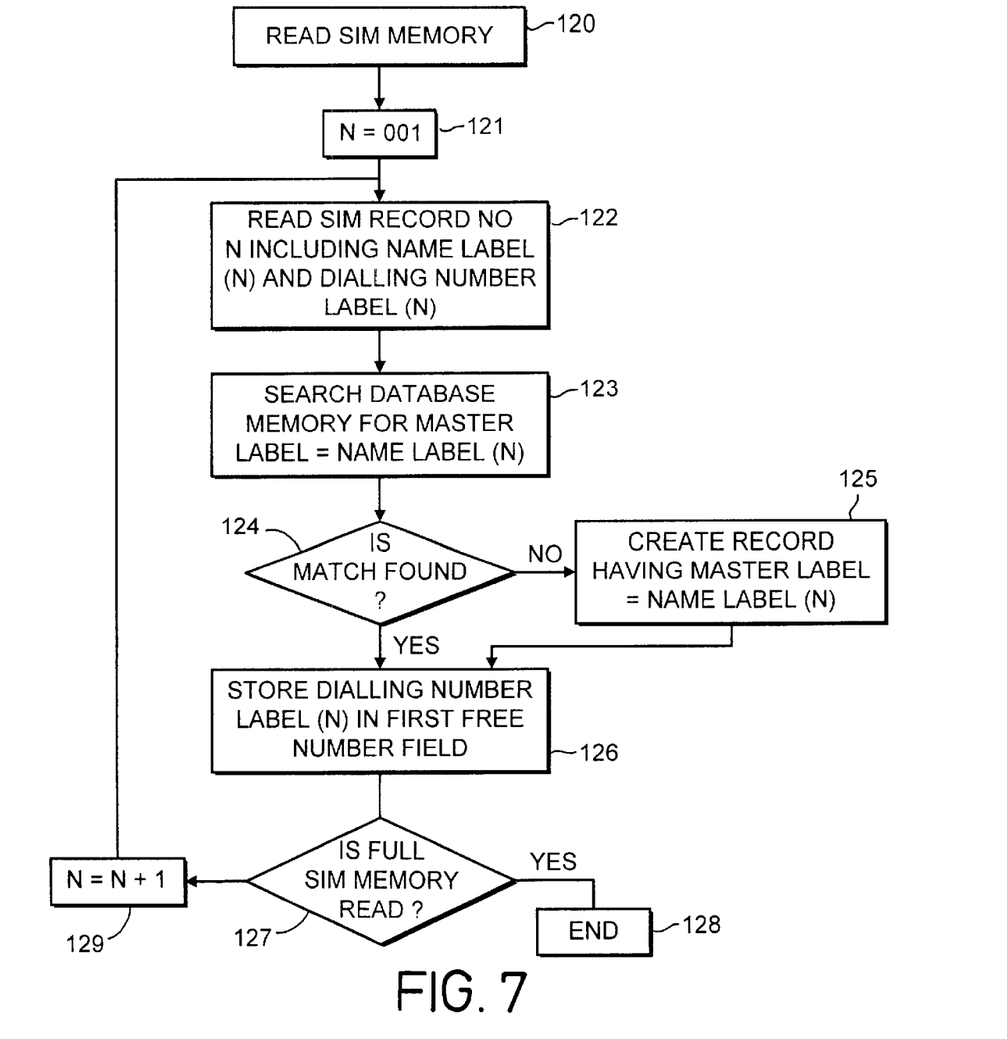
FIG. 7 shows a flow diagram handling the transfer of the SIM memory to the internal phonebook memory.

Advantageously when the phone 1 is started up or when a new SIM card has been inserted the full phonebook memory from the SIM card 16 is copied to the RAM memory of the phone, step 120; FIG. 7. The linear memory 100, FIG. 6, on the SIM card 16 is converted into a database memory 104 having a variable number of records 107 each including a master label field 105 and four dialing number fields 106. In step 121 the processor 18 initializes a counter and starts to read the first record (addressed out by the counter value). In step 123 the processor 18 looks in the database memory 104 in order to find a master label matching the read name label. If no matching master label is found in step 124, the processor creates a record having the read name label as master label in step 125. In step 126 the read dialing number is stored in the first free number field in the record having the name label as master label. In step 127 the processor 18 checks whether the full SIM memory 100 has been read and ends the reading in step 128 if that is the case. If the full SIM memory 100 still includes unread records the value of the counter is incremented by one in step 129 and the next record is read in step 122.

Figure 4:
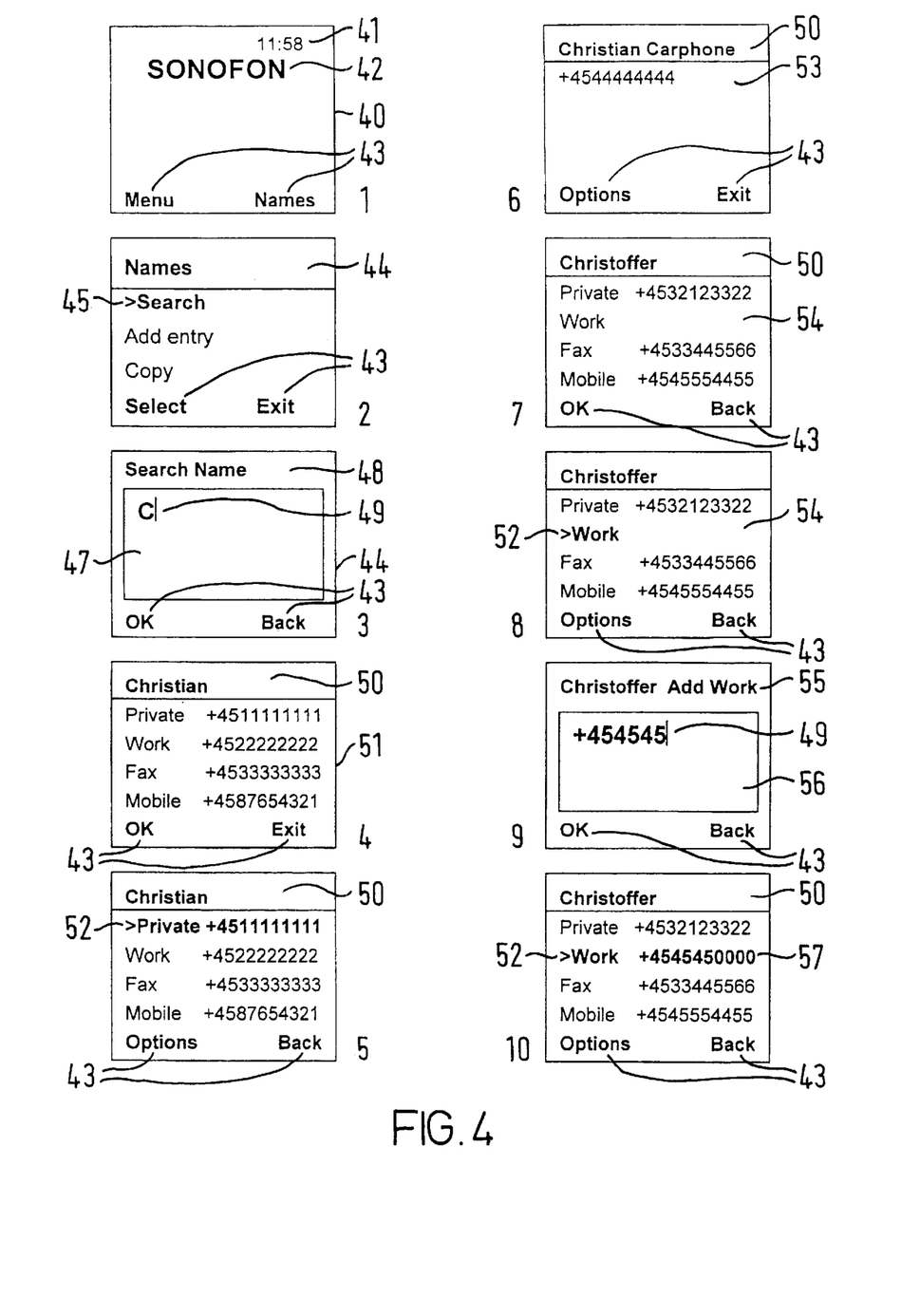
FIG. 4 shows a sequence of displays in order to illustrate the phonebook handling according to the invention.
Figure 5:
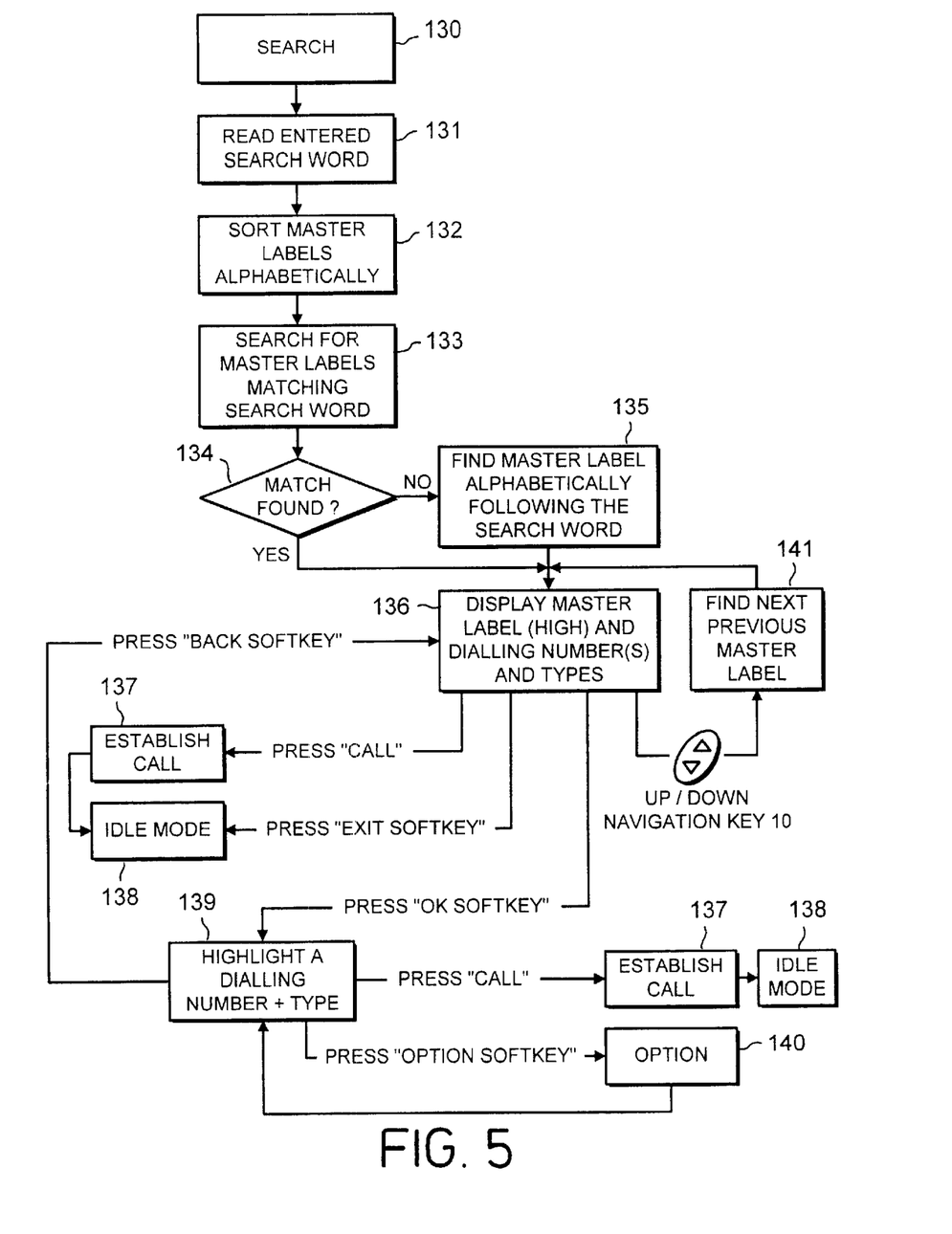
FIG. 5 shows a flow chart for the phonebook search in order to illustrate the phonebook handling according to the invention.

The invention will with reference to the display sequences shown in FIG. 4 and the flow chart of FIG. 5 be described in relation to a menu structure which is well known from the phones manufactured by the applicant, e.g. the Nokia 3810™.

An idle mode display 40 for the phone 1 includes two bars indicating the signal strength and the battery level. Furthermore there is a time indication 41, an identification 42 of the operator to which the phone is presently connected, and two labels 43 indicating the present functionality (Menu: access to the Menu structure; Names: access to the Phonebook) of the two soft keys 8. When pressing the right soft key 8 (Names) a menu list including valid operations in the phonebook will appear on the screen. These operations will include:

1. Search
2. Add entry
3. Erase
4. Copy
5. Option
6. Speed dials
7. Caller groups.

The first three items from this list are shown in the second display of FIG. 4. a header 44 indicates that "Names" has been selected. One of the items 45 is highlighted (bold font) indicating that this item 45 will be selected when the left "Select" soft key 8 is pressed. The other items on the list will be accessible by pressing the up/down navigation key 10. Pressing the right "Exit" soft key 8 bring the phone back to idle mode (idle mode display 40).

When the user selects the "Search" operation from the "Names" menu a "search name" display 44 will appear. The phone will prepare for a search in the phonebook, step 130 in FIG. 5. This display will include a header 45 indicating the mode of the display, a text field 47 into which letters may be entered by means of the alphanumeric keys 7, and the two labels 43 indicating the present functionality (OK: initiate Phonebook search based on the entered letters; Back: jump back to the previous menu level) of the two soft keys 8. A cursor 49 in the text field 47 indicates the position of the next letter to be entered. The navigation key 10 controls the position of the cursor 49. When pressing the right "Back" soft key 8 no search will be performed. By pressing the left "OK" soft key 8 the search in the list of name labels will start based on the entered search word—very often just a single letter; step 131 in FIG. 5.

Pressing the navigation key 10 in idle mode will access the phonebook the same way as if the phonebook (Names)

was selected and the letter "A" was used as input for the search operation.

According to one embodiment of the invention the processor 18 sorts the master labels in alphabetic order. Actually this was done when the SIM card memory was copied to the phone memory as explained with reference to FIG. 7. Then the processor 18 in step 133 starts to compare the entered search word with the master labels listed in alphabetic order in the master label list established when the phone 1 is switched on. Basically the processor 18 may start from the beginning of the list, "A", and continue until it finds a matching master label, step 134, or the first master label "higher" than the search word, e.g. "Christian" when the search word is "C" when no matching word is found.

In step 136 the found master label is displayed and the preferred embodiment of the displaying is shown in the fourth display in FIG. 4. It is seen that the master label "Christian" is displayed as a header 50. The four dialing numbers are displayed in a column 51 in the order determined by their position on the SIM card. A second column 52 displays a predetermined set of type labels—here "home", "work", "fax" and "mobile". Appropriate icons can replace the mentioned type labels. The two labels 43 indicating the present functionality (OK; Exit) of the two soft keys 8. When pressing the call handling key 9 for establishing a call the phone number (Christian private) in the top of the list will be called as default. When the call is terminated the phone goes from the call mode 137 back to idle mode 138. By pressing the right "Exit" soft key 8 the phone goes back to idle mode 138.

By pressing the left "OK" soft key 8 the displayed name will be selected and the user will by means of the navigation key 10 in step 139 be able to move a kind of cursor highlighting one 52 of the dialing numbers (here the private number is typed with bold characters) in the fifth display of FIG. 4. When the call handling key 9 is pressed a call to the highlighted phone number is established. When the call is terminated the phone goes from the call mode 137 back to idle mode 138. By pressing the right "Back" soft key 8 the phone goes back to step 136 where the master label is highlighted.

When the right "Back" soft key 8 is pressed the fourth display will be displayed once more. Now when the user presses the navigation 10 in upwards or downwards direction the processor 18 will in step 141 find the next master label and turn over to display the next or the preceding master label in alphabetic order, accordingly. The sixth display has the header 50 containing the master label "Christian carphone". Note that the dialing number 53 associated with this master label is not marked with a type label. In step 136 the processor checks whether one or more dialing numbers are associated with the master label. If only one number is associated with the master label there is no need for associating type labels with the number. Actually no type label matches with the dialing number, because the dialing number represents a cellular phone mounted permanently in a car.

By pressing the navigation key 10 once more the seventh display of FIG. 4 will appear. This display has a header 50 displaying the master label "Christoffer" in the already discussed multi number per name format. It must be noted that no dialing number has been entered for "Work". However a memory location has been reserved for this dialing number as explained above. If the user now wants to fill in the empty field 54 he has to press the left "OK" soft key 8, and the eighth display will appear. By means of the navigation key the highlighted cursor 52 (Bold characters) may be moved to the desired row ("work") as done in the eighth display of FIG. 4.

By pressing the "Option" soft key 8 an option list will appear on the display. This option list will offer the various operations that can be performed on the data pointed out. These operations may include:

1. Add.
2. Edit.
3. Erase.
4. Send via IR.
5. Print via IR.
6. Send.

The user wants to add the work number of Chistoffer and therefore selects the "Add" option. The phone will be in option mode 140 where the user is requested to input necessary information. The display changes and the ninth display of FIG. 4 appears on the screen. The header 55 explains what is going on—Christoffer's work number is added. A text entry field 56 is open for writing by using the alphanumeric keys 7. The cursor 49 marks the entry position and is controlled by the navigation key 10. The left "Back" soft key 8 will when pressed interrupt the adding and cause the phone to go back to the eighth display without adding the entered characters. When the full number has been entered the left "OK" soft key 8 must be pressed in order to store the entered dialing number. Then the tenth display will appear. It is seen that the recently added number is displayed and marked with the cursor 52. The phone will be in step 139 in FIG. 5. The processor automatically up-dates the SIM memory 100 when the phone memory 104 is edited.

It should be noted that pressing the call termination key 9 in any step in the phonebook handling will cause the phone to go back to the idle mode regardless of the function of the soft keys 10.

The Option list does basically include a number of edit operations, such as "Add", "Edit", and "Erase". Furthermore the phone supports transmission of phonebook items to another phone via a not shown IR link or via the Smart Messaging concept shown on the Cebit fair 1997 by the applicant or to a printer via a not show IR link.

Figure 8A:
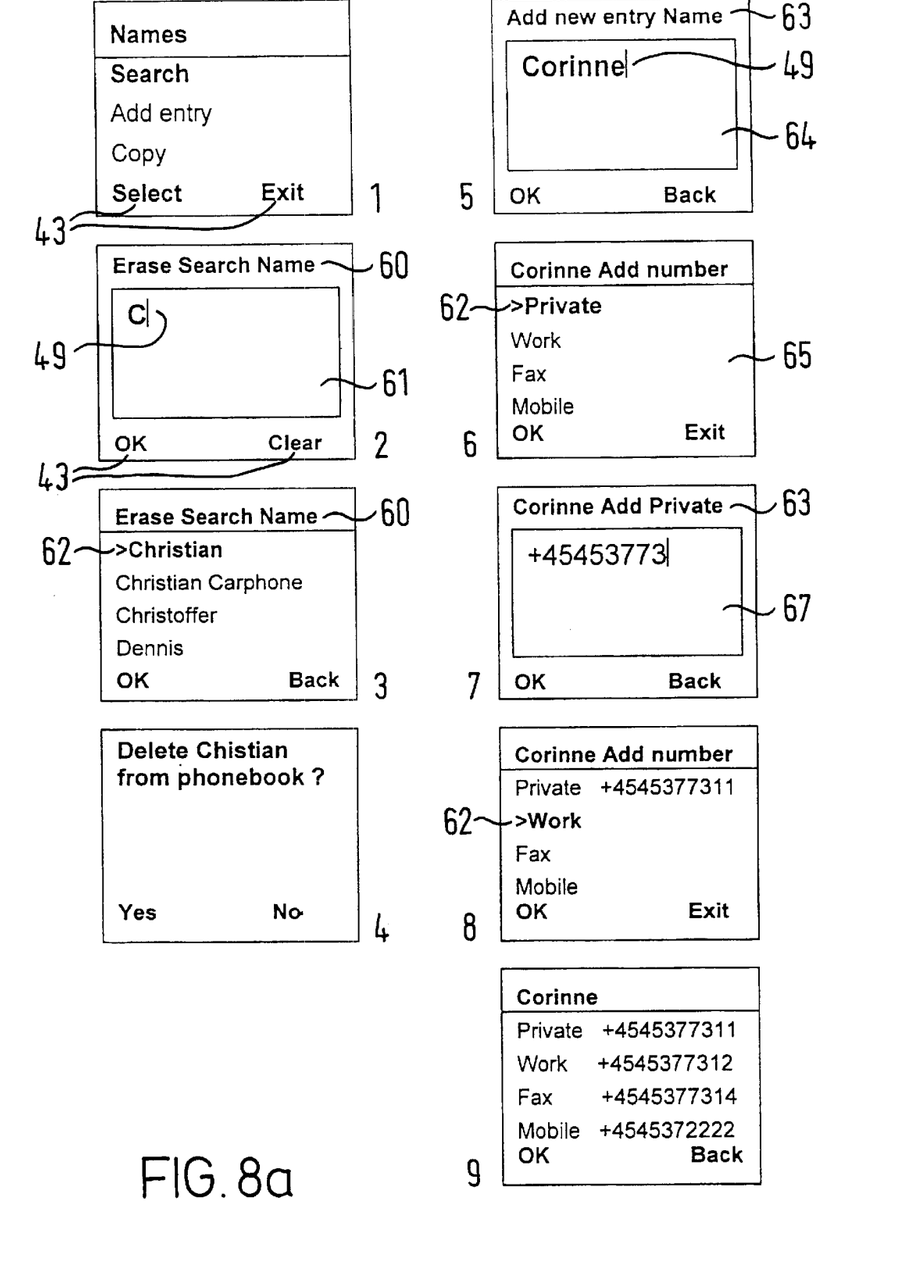
FIGS. 8a and 8b show a sequence of displays illustrating the phonebook editing according to the invention.
Figure 8B:
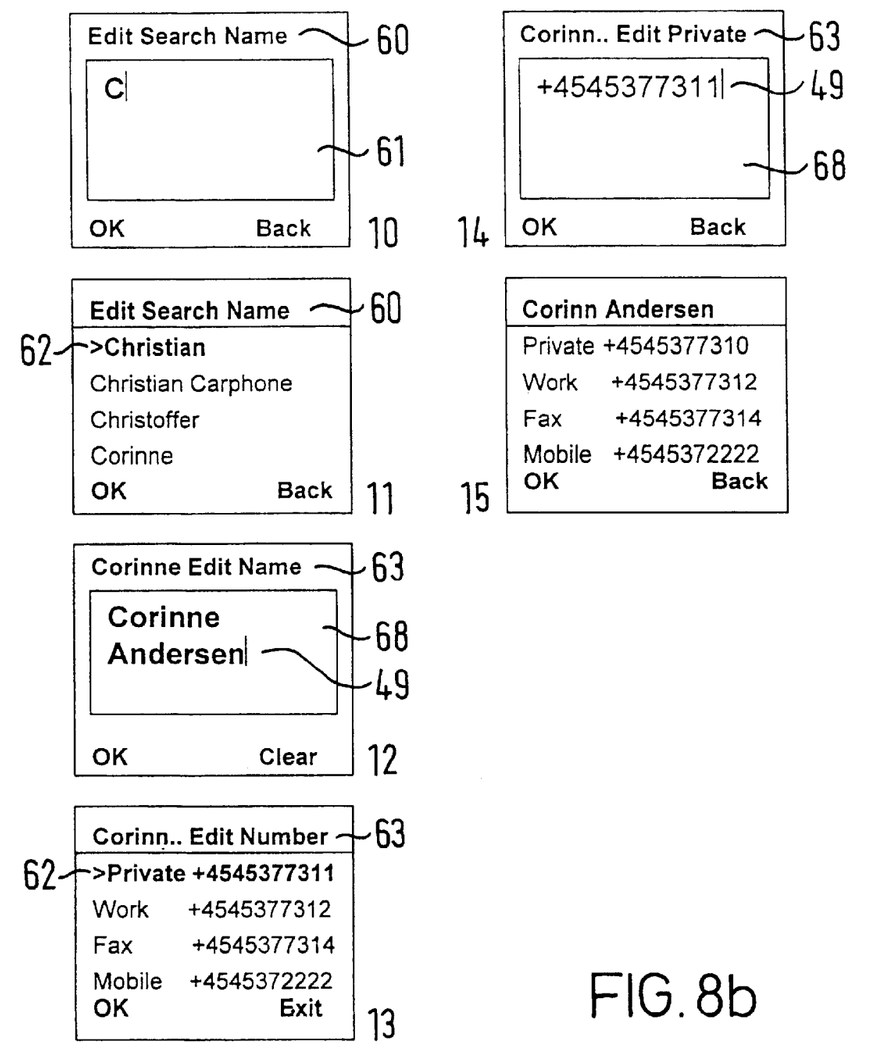

Basically all three edit operations may be handled as explained with reference to FIG. 8. "Add" will add data to a new record, "Edit" will edit an existing record and "Erase" will remove an existing record. These operations may be accessed either from the "Names" entry display—the second display of FIG. 4—where no record is selected or from the name and number display via the "Option" soft key 8 where a record is selected. In the name and number display (eighth display in FIG. 4) a number may be added to an empty space by selecting "Add" or "Edit" in the Option menu. The user is requested to enter the dialing number in an entry window 56. Similar to this a number may be erased by selecting "Erase" or "Edit" (here the user has to delete the exiting numbers manually) and then confirm the erasing of the number in a dialog box.

Erasing Existing Records.

With reference to display 1 to 4 in FIG. 8 it will be explained how the user erases a full record. When pressing the right "Names" soft key 8 (FIG. 4; first display) the first display in FIG. 8 will appear on the phone 1. When selecting "Erase" from the menu list shown in conjunction with FIG. 4 the second display will be seen. Here a header 60 will inform the user that the phone 1 has been asked to delete a phonebook record and now a search for the record has started. The user may enter a search string in the entry window 61 by means of the alphanumeric keys 7. When pressing the left "OK" soft key 8 after entering a "C" then a group of matching names is suggested in the third display, and the best matching name, "Christian" is marked by a cursor 62. The navigation key 10 controls the position of the cursor 62. When the left "OK" soft key 8 is selected, the user is asked to confirm his instruction in the fourth display. If the user confirms by pressing the left "OK" soft key 8 the "Christian" record is removed from the memory 104, a notice is displayed in the display (not shown) and the phone goes back to idle mode. Simultaneously with the deletion of the "Christian" record from the memory 104, the processor deletes the four records in the SIM memory 100, too. These records will now be empty and new data may be entered.

Adding New Records.

Now it will be explained with reference to display 5 to 9 in FIG. 8 how the user adds a new record. When pressing the right "Names" soft key 8 (FIG. 4; first display) the first display in FIG. 8 will appear on the phone 1. When selecting "Add entry" from the menu list shown in conjunction with the discussion of FIG. 4 the fifth display will be seen. Here a header 63 will inform the user that the phone 1 has been asked to add a new phonebook record and now the user is asked to enter a string in the entry window 64 by means of the alphanumeric keys 7. The navigation key 10 controls the position of the cursor 49. This string will be used as master label in the phonebook. When pressing the left "OK" soft key 8 the type label display 65 appears (sixth display of FIG. 8). The user may navigate a cursor 62 by means of the navigation key 10 and select the type of number he wants to input by pressing the left "OK" soft key 8.

Then an entry window 67 will appear. The header 63 informs the user that he is entering the private number of "Corinne" for adding into the phonebook. Pressing the left "OK" soft key 8 enters the number. The entered number will then be added to the type label display 65 and a new number type may be selected. In the eighth display the user has highlighted "Work" label and pressing the left "OK" key will cause a number entry window similar to the seventh display to pop up. When the user has entered the numbers he wants he presses the right "Exit" soft key 8 and the phone will leave the Add new record mode. Next time "Corinne" is searched in the phonebook the ninth display will be displayed.

Editing Existing Records.

With reference to display 10 to 15 in FIG. 8 it will be explained how the user edits an existing record. When pressing the right "Names" soft key 8 (FIG. 4; first display) the first display in FIG. 8 will appear on the phone 1. When selecting "Edit" from the menu list shown in conjunction with FIG. 4 the tenth display will be seen. Here a header 60 will inform the user that the phone 1 has been asked to edit a phonebook record and now a search for the record has started. The user may enter a search string in the entry window 61 by means of the alphanumeric keys 7. When pressing the left "OK" soft key 8 after entering a "C" then a group of matching names is suggested in the eleventh display, and the best matching name, "Christian" is marked by a cursor 62. The navigation key 10 controls the position of the cursor 62. When the cursor 62 has been moved to "Corinne" pressing the left "OK" soft key 8 a text edit display 68 (twelfth) will be displayed. A header 63 will inform the user that the phone 1 has been asked to edit the existing "Corinne" record in the phonebook. The display will include the presently entered master label "Corinne". The position of the cursor 49 is controlled by the navigation key 10 and the character on the left side of the cursor 49 may be deleted by pressing the right "Clear" soft key 8. A long press (more than 0.8 sec) of the right "Clear" soft key 8 will clear the full display. When the user has finalized the editing of the master label he has to press the left "OK" soft key 8.

Then a type label display 65 appears (see the thirteenth display) and the user may select the dialing number type he wants to edit. He may move the cursor 62 by means of the navigation key 10 and he selects a type by pressing the left "OK" soft key 8. Then a number edit display 68 will occur as the fourteenth display. The header 63 indicates that the private number of Corinne Andersen (truncated) is presently edited. The display will include the presently entered dialing number. The position of the cursor 49 is controlled by the navigation key 10 and the character on the left side of the cursor 49 may be deleted by pressing the right "Clear" soft key 8. A long press (more than 0.8 sec) of the right "Clear" soft key 8 will clear the full display. When the user has finalized the editing of the dialing number he has to press the left "OK" soft key 8. Then a number entry window similar to the thirteenth display will pop up. When the user has edited the numbers he wants to edit he presses the right "Exit" soft key 8 and the phone will leave the Edit mode. Next time "Corinne" is searched in the phonebook the fifteenth display will be displayed.

The Type label list does also include a fifth label "not specified". When a dialing number is stored as such a type the number will not be associated with any type. Only the master label and the number will be displayed in the phonebook. The label will not cause any "dummy" records to be stored in the SIM memory 100. "Christian carphone" was stored as such a "not specified" type. The "not specified" type is accessed by moving the cursor to the bottom of the list and the display will turn around.

When a SIM card 16 is transferred from a phone supporting the multi number per name concept according to the invention to a phone that does not support this concept the same name will appear several times when viewing the phonebook. The phone will typically display these names right after each other in the "name view" (alphabetical ordered view).

Figure 9:
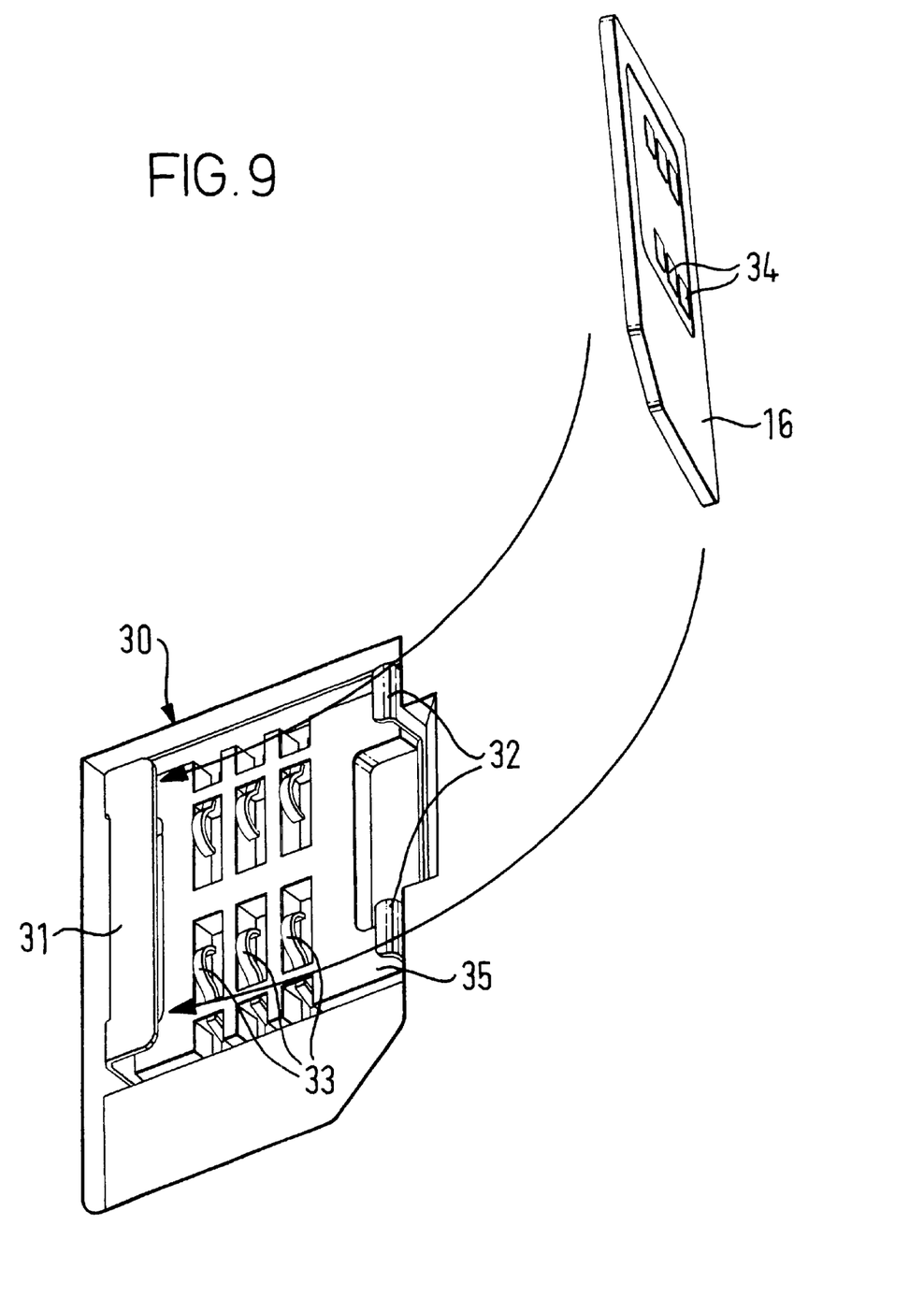
FIG. 9 shows a SIM card holder provided in recess in the back of the phone.

FIG. 9 shows a per se known SIM card holder 30 provided in recess in the back of the phone and normally covered by a battery pack. The SIM card holder 30 includes a connector block 35 mounted on the printed circuit board (PCB—not shown) of the phone 1. This connector block 35 has six resilient connector legs operatively connecting the the SIM card 16 via six corresponding metallic pads 34 to the processor 18. When the SIM card 16 is placed in the holder 30 one side of the card 16 is positioned in engagement with a gripping wall 31 and the opposite wall is locked by two gripping fingers 32. These fingers 32 may be drawn back when the SIM card 16 is inserted or removed.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of handling phonebook records stored on an exchangeable smart card in order to display dialing numbers associated with a requested name label on a display of a mobile terminal, said smart card includes a phonebook memory having a group of records each of which is associated with a record identification number, a name label field in which a name label may be stored and a single dialing number field in which a dialing number may be stored, said method includes steps of:

sorting in the phonebook memory in order to identify records in said group of records having name labels corresponding to the requested name label;

creating records corresponding to the requested name label in a memory of the mobile terminal where the records include:

a field for storing a master label corresponding to one of the name labels; and a plurality of dialing number fields associated with each master label for receiving the dialing numbers of each name label in a predetermined order determined by the record identification numbers for the dialing numbers in the phonebook memory;

associating the dialing numbers of the identified records with a type label in dependence of the corresponding record identification number; and displaying each name label requested together with each dialing number and associated type label.

2. Method of handling phonebook records according to claim 1 wherein a content of the phonebook memory is updated when a user edits a content of the memory of the mobile terminal.

3. A communication terminal for handling phonebook records stored on an exchangeable smart card in order to display dialing numbers associated with a requested name label, said smart card includes a phonebook memory having a group of records each of which is associated with a record identification number, a name label field in which a name label may be stored and a dialing number field in which a dialing number may be stored, said terminal comprises:

display means for displaying information;

means for establishing a releasable connection to an exchangeable smart card; and processor means for processing the phonebook information to be displayed in the display upon request from the user, said processor means being adapted to:

sort the phonebook memory in order to identify records in said group of records having name labels corresponding to the name label requested;

associate the dialing numbers of the identified records with a type label in dependence of the corresponding record identification number, and set up a display image for the display in which the requested name label is associated one or more dialing, numbers that are identified by the type label.

4. A communication terminal according to claim 3, and comprising a volatile memory for receiving a content of the phonebook memory, said processor creates records in said volatile memory and the records include:

a field for storing a master label corresponding to one of said name labels; and a plurality of number fields for receiving said dialing numbers in a predetermined order determined by the record identification numbers for said dialing numbers in the phonebook memory.

5. A communication terminal according to claim 4, wherein the processor updates the content of the phonebook memory when the user edits the content of the volatile memory.

6. A communication terminal according to claim 4, wherein the processor uses the relative record identification numbers to link the dialing numbers and the type labels together.

7. The communication terminal of claim 3 wherein the type label is a work phone number, a private phone number, a fax number or a mobile phone number.

8. A method of handling a transfer of phonebook data between a memory of a mobile phone and an exchangeable smart card adapted to be electrically coupled to the mobile phone for the transfer of the phonebook data, the method comprising the steps of:

reading a record from the smart card, the smart card including a plurality of linear memory records, each record having a name label and a single dialing number associated with the name label;

determining if the memory of the phone includes a record having a master label corresponding to the name label, each master label being associated with a plurality of dialing number fields; and storing the single dialing number in a next free dialing number field of the master label corresponding to the name label.

9. The method of claim 8 further comprising the step of displaying a requested master label on a display of the phone, together with a plurality of dialing number fields associated with the requested master label.

10. The method of claim 8 further comprising the step of creating a master label in the memory of the phone when the name label does not have a corresponding master label stored in the memory of the phone.

11. The method of claim 8 further comprising repeating the steps, for each record stored on the smart card, of:

reading a record from the smart card;

determining if the memory of the phone includes a record having a master label corresponding to the name label; and storing the single phone number in a next free dialing number field in the record of the corresponding master label.

12. The method of claim 8 further comprising the step of transferring phonebook data from the memory of the phone to the smart card by the steps comprising:

reading a master label record from the memory of the phone;

creating a name label in the smart card corresponding to the master label record, a single dialing number field being associated with the name label;

transferring a dialing number from a dialing number field in the memory of the phone to the dialing number memory field associated with the name label in the smart card;

determining if another dialing number is associated with the master label record, and repeating the steps, for each dialing number associated with the master label record, of:

creating a name label in the smart card corresponding to the master label record, a single dialing number field being associated with the name label; and transferring a dialing number from a dialing number field in the memory of the phone to the dialing number memory field associated with the name label in the smart card;

wherein a memory position corresponding to each name label created in the smart card is assigned a sequentially increasing value and when phonebook data on the smart card is transferred to a mobile phone, the phonebook data is transferred in an order beginning with phonebook data stored in a least significant position.

13. The method of claim 12 further comprising the step of transferring the smart cart to a terminal that does not support multiple dialing number fields associated with a single name label, wherein when the phonebook data is transferred from the. smart card to the terminal a relative position of the dialing number in the smart card memory determines a type of dialing number being associated with each name label.

* * * * *